United States Patent
Tulsian et al.

(10) Patent No.: US 10,996,938 B2
(45) Date of Patent: May 4, 2021

(54) AUTOMATED SELECTION OF SOFTWARE IMAGES FOR NETWORK DEVICES

(71) Applicant: Juniper Networks, Inc., Sunnyvale, CA (US)

(72) Inventors: Rishabh Ramakant Tulsian, Livermore, CA (US); Jacopo Pianigiani, Cupertino, CA (US); Sridevi JeevaRaj, San Jose, CA (US); Sahana Sekhar Palagrahara Chandrashekar, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/588,554

(22) Filed: Sep. 30, 2019

(65) Prior Publication Data

US 2021/0019131 A1    Jan. 21, 2021

Related U.S. Application Data

(60) Provisional application No. 62/874,387, filed on Jul. 15, 2019.

(51) Int. Cl.
*G06F 8/61* (2018.01)
*H04L 12/24* (2006.01)
*H04L 29/08* (2006.01)

(52) U.S. Cl.
CPC ............... *G06F 8/63* (2013.01); *H04L 41/20* (2013.01); *H04L 41/24* (2013.01); *H04L 67/16* (2013.01); *H04L 67/34* (2013.01); *H04L 67/12* (2013.01)

(58) Field of Classification Search
USPC ........................................................ 717/177
See application file for complete search history.

(56) References Cited

U.S. PATENT DOCUMENTS

| 6,292,485 B1 * | 9/2001 | Trotta | ............... H04L 29/06 370/389 |
|---|---|---|---|
| 10,291,497 B2 | 5/2019 | Mehta et al. | |

(Continued)

FOREIGN PATENT DOCUMENTS

WO    2013184846 A1    12/2013

OTHER PUBLICATIONS

"Extreme IP Fabric Architecture"; AmazonAWS.com website; Apr. 2018 (Year: 2018).*

(Continued)

*Primary Examiner* — Qing Chen
*Assistant Examiner* — Clint Thatcher
(74) *Attorney, Agent, or Firm* — Shumaker & Sieffert, P.A.

(57) ABSTRACT

A data center network can include numerous switches, routers and servers to deliver services to customers. The network devices in the data center may be automatically discovered through various discovery workflows. Once discovered, hardware configuration information for the network devices may be stored in a database. Additionally, an administrator may assign roles to the network devices. The hardware configuration information may be matched with features provided by software images. A server may select a software image from a variety of candidate software images by matching the features provided by the software images and the hardware supported by the software images to the hardware configurations and roles of the network devices. Thus, new network devices may be deployed and provisioned to data center in a standardized and automated way. Further, existing network devices may be upgraded or reconfigured in a standardized and automated way.

19 Claims, 8 Drawing Sheets

(56) References Cited

U.S. PATENT DOCUMENTS

| | | |
|---|---|---|
| 2010/0100778 A1 | 4/2010 | Sullivan |
| 2013/0198346 A1 | 8/2013 | Jubran et al. |
| 2015/0094984 A1 | 4/2015 | Kenworthy |
| 2016/0170775 A1* | 6/2016 | Rockwell ............ G06F 13/4282 713/100 |
| 2017/0171021 A1 | 6/2017 | Angaluri et al. |
| 2017/0371649 A1* | 12/2017 | Li ............................ G06F 8/71 |
| 2019/0104398 A1 | 4/2019 | Owen et al. |
| 2019/0278588 A1* | 9/2019 | Miyake ................ B60R 16/023 |
| 2020/0204492 A1* | 6/2020 | Sarva ................. H04L 41/0803 |

OTHER PUBLICATIONS

O. T. Satyanarayanan; "Software Image Management for Large Networks"; IEEE Workshop on IP Operations and Management (pp. 217-221); 2002 (Year: 2002).*

Hopps, "Analysis of an Equal-Cost Multi-Path Algorithm," RFC 2992, Network Working Group, Nov. 2000, 8 pp.

Extended Search Report from counterpart European Application No. 19219210.2, dated Jun. 26, 2020, 10 pp.

* cited by examiner

AUTOMATED SELECTION OF SOFTWARE IMAGES FOR NETWORK DEVICES

RELATED APPLICATION

This application claims the priority benefit of U.S. Provisional Patent Application Ser. No. 62/874,387, filed Jul. 15, 2019, the entire contents of which is incorporated herein by reference.

TECHNICAL FIELD

The disclosure relates to computer networks and, more particularly, to provisioning software for network devices and servers.

BACKGROUND

In a typical cloud data center environment, a large collection of interconnected servers provide computing (e.g., compute nodes) and/or storage capacity to run various applications. For example, a data center comprises a facility that hosts applications and services for customers of the data center. The data center, for example, hosts all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

A typical data center can include hundreds of physical network switches and thousands of storage and application servers. These devices can have different hardware and software configurations. As a result, many different software images may be needed in order to provide proper and efficient intended functionality.

SUMMARY

One way to configure and provision new switches and new servers in a data center is to download the configuration and software via the physical network to the new servers and switches. However, in a new data center, there may be thousands of servers and switches that require configuration and provisioning. In some data center systems, configuration and software provisioning may be a largely manual process. For example, a data center administrator may use a self-made record such as a spreadsheet to track the different network devices in a data center and the corresponding software that was loaded onto the network devices. Manual configuration and provisioning can be time consuming and error prone. As a result, manual configuration may be impractical in a data center having hundreds of switches and thousands of servers requiring configuration.

In some examples, data center may include a network such as an IP Clos IP fabric with a control plane such as an Ethernet Virtual Private Network (EVPN) control plane. Tenants of the data center may use network devices such as switches, routers and servers to deliver business critical services to their customers and employees. The network devices in the data center may be automatically discovered through various discovery workflows. Once discovered, hardware configuration information for the network devices may be stored in a database. Additionally, an administrator or other party may assign various roles for the network devices. The hardware configuration information may be matched with features provided by software images. A server such as a fabric management server may select a software image from a variety of candidate software images by matching the features provided by the software images and the hardware supported by the software images to the hardware configurations and roles of the network devices. Thus, new network devices may be deployed and provisioned to data center in a standardized and automated way. Further, existing network devices may be upgraded or reconfigured in a standardized and automated way using the techniques described herein.

The example techniques described below are provided in the context of configuring switches and servers in a data center. The techniques can also be applied in other computer network environments besides data centers where there are numerous switches and servers that require configuration.

The techniques of this disclosure may provide one or more advantages. For example, the techniques may enable accurate and rapid configuration and provisioning of the physical switches and servers in a data center with software images that are automatically selected based on the hardware configuration and roles assigned to the switches and servers. The techniques can significantly reduce the need for time consuming and error-prone manual configuration of potentially thousands of network devices in a data center, thereby allowing for scalable configuration and provisioning of large data centers having many network devices.

In one example aspect, a method includes obtaining, by a fabric management server, hardware capability information for a network device communicably coupled to an IP fabric; obtaining, by the fabric management server, software capability information for each software image of a plurality of software images, the software capability information specifying a plurality of features provided by the software image; identifying, based on the hardware capability information for the network device and the software capability information, the software image of the plurality of software images to be installed on the network device; and providing an indication of the identified software image.

In another example aspect, a system includes a network device communicably coupled to an IP fabric; and a fabric management server configured to: obtain hardware capability information for the network device, obtain software capability information for each software image of a plurality of software images, the software capability information specifying a plurality of features provided by the software image, identify, based on the hardware capability information for the network device and the software capability information, the software image of the plurality of software images to be installed on the network device, and provide an indication of the identified software image.

In a further example aspect, a computer-readable medium includes instructions for causing one or more programmable processors to: obtain hardware capability information for the network device; obtain software capability information for each software image of a plurality of software images, the software capability information specifying a plurality of features provided by the software image; identify, based on the hardware capability information for the network device and the software capability information, the software image of the plurality of software images to be installed on the network device; and provide an indication of the identified software image.

The details of one or more examples are set forth in the accompanying drawings and the description below. Other features, objects, and advantages will be apparent from the description and drawings, and from the claims.

DETAILED DESCRIPTION

Figure 1:
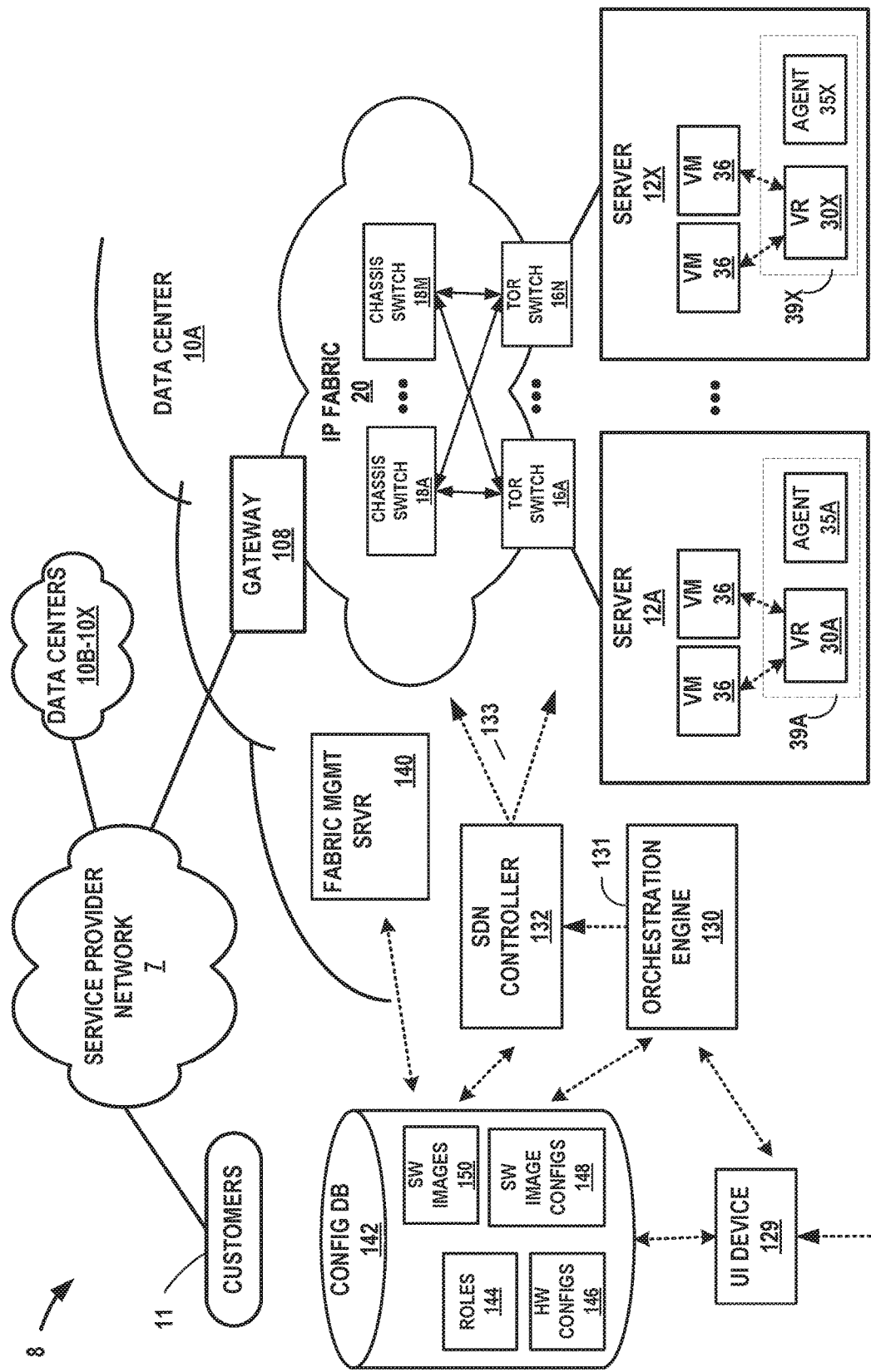
FIG. 1 is a block diagram illustrating an example computer network system in accordance with techniques described herein.

FIG. 1 is a block diagram illustrating an example computer network system 8 in accordance with techniques described herein. The example computer network system 8 can be configured and network devices can be provisioned using the techniques described below with respect to FIGS. 2, 3A-3E, 4 and 5.

Computer network system 8 in the example of FIG. 1 includes data centers 10A-10X (collectively, "data centers 10") interconnected with one another and with customer networks associated with customers 11 via a service provider network 7. FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for customers 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers and may thus form part of a large-scale public network infrastructure, e.g., the Internet. In some examples, data center 10A may represent one of many geographically distributed network data centers. As illustrated in the example of FIG. 1, data center 10A is a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific, or super-computing, and so on. In some examples, data center 10A is an individual network server, a network peer, or otherwise.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more application workloads. As described herein, the terms "application workloads" or "workloads" may be used interchangeably to refer to application workloads. Workloads may execute on a virtualized environment, such as a virtual machine 36, a container, or some of type of virtualized instance, or in some cases on a bare metal server that executes the workloads directly rather than indirectly in a virtualized environment. Each of servers 12 may be alternatively referred to as a host computing device or, more simply, as a host. A server 12 may execute one or more of workloads 37 on one or more virtualized instances, such as virtual machines 36, containers, or other virtual execution environment for running one or more services (such as virtualized network functions (VNFs)). Some or all of the servers 12 can be bare metal servers (BMS). A BMS can be a physical server that is dedicated to a specific customer or tenant.

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected top-of-rack (TOR) switches 16A-16N (collectively, "TOR switches 16") coupled to the distribution layer of chassis switches 18A-18M (collectively, "chassis switches 18"). In some examples, chassis switches 18 may operate as spine nodes and TOR switches 16 may operate as leaf nodes in data center 10A. Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7. Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and customers 11 by service provider network 7.

Switch fabric 20 may perform layer 3 routing to route network traffic between data center 10A and customers 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via a northbound API 131, which in turn operates in response to configuration input received from an administrator 24 operating user interface device 129. In some aspects, the SDN controller 132 may be part of a high availability (HA) cluster and provide HA cluster configuration services. Additional information regarding SDN controller 132 operating in conjunction with other devices of data center 10A or other software-defined networks is found in International Application Number PCT/US2013/044378, filed Jun. 5, 2013, and entitled "PHYSICAL PATH DETERMINATION FOR VIRTUAL NETWORK PACKET FLOWS," and in U.S. patent application Ser. No. 15/476,136, filed Mar. 31, 2017 and entitled, "SESSION-BASED TRAFFIC STATISTICS LOGGING FOR VIRTUAL ROUTERS," wherein both applications are incorporated by reference in their entirety as if fully set forth herein.

For example, SDN platforms may be used in data center 10 to control and manage network behavior. In some cases, an SDN platform includes a logically centralized and physically distributed SDN controller, such as SDN controller 132, and a distributed forwarding plane in the form of virtual routers that extend the network from physical routers and switches in the data center switch fabric into a virtual overlay network hosted in virtualized servers.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. One such communication protocol may include a messaging communications protocol such as eXtensible Messaging and Presence Protocol (XMPP), for example. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a virtualized environment. SDN controller 132 maintains routing, networking, and configuration information within a state database. SDN controller 132 communicates a suitable subset of the routing information and configuration information from the state database to virtual router (VR) 30A-30X or agents 35A-35X ("AGENT" in FIG. 1) on each of servers 12A-12X.

As described herein, each of servers 12 include a respective forwarding component 39A-39X (hereinafter, "forwarding components 39") that performs data forwarding and traffic statistics collection functions for workloads executing on each server 12. In the example of FIG. 1, each forwarding component is described as including a virtual router ("VR 30A-VR 30X" in FIG. 1) to perform packet routing and overlay functions, and a VR agent ("VA 35A-35X" in FIG. 1) to communicate with SDN controller 132 and, in response, configure the virtual routers 30.

In this example, each virtual router 30A-30X implements at least one routing instance for corresponding virtual networks within data center 10 and routes the packets to appropriate virtual machines, containers, or other elements executing within the operating environment provided by the servers. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In the example of FIG. 1, SDN controller 132 learns and distributes routing and other information (such as configuration) to all compute nodes in the data center 10. The VR agent 35 of a forwarding component 39 running inside the compute node, upon receiving the routing information from SDN controller 132, typically programs the data forwarding element (virtual router 30) with the forwarding information. SDN controller 132 sends routing and configuration information to the VR agent 35 using a messaging communications protocol such as XMPP protocol semantics rather than using a more heavy-weight protocol such as a routing protocol like the Border Gateway Protocol (BGP). In XMPP, SDN controller 132 and agents communicate routes and configuration over the same channel. SDN controller 132 acts as a messaging communications protocol client when receiving routes from a VR agent 35, and the VR agent 35 acts as a messaging communications protocol server in that case. Conversely, SDN controller 132 acts as a messaging communications protocol server to the VR agent 35 as the messaging communications protocol client when the SDN controller sends routes to the VR agent 35. SDN controller 132 may send security policies to VR agents 35 for application by virtual routers 30.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 10A such as compute, storage, networking, and application resources. For example, orchestration engine 130 may create a virtual network for a tenant within data center 10A or across data centers. Orchestration engine 130 may attach workloads (WLs) to a tenant's virtual network. Orchestration engine 130 may connect a tenant's virtual network to an external network, e.g. the Internet or a VPN. Orchestration engine 130 may implement a security policy across a group of workloads or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 20 or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular traffic flow over a single deterministic path.

Virtual routers (virtual router 30A to virtual router 30X, collectively "virtual routers 30" in FIG. 1) execute multiple routing instances for corresponding virtual networks within data center 10A and routes the packets to appropriate workload executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multi-protocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

Data center 10A can have thousands of chassis switches 18 and TOR switches 16, and hundreds of servers 12. The example illustrated in FIG. 1 represents a fully configured data center 10A. When the data center 10A is first being set up, these network devices require configuration and software provisioning. Further, it may be desirable to ensure the devices are using a known and/or standard version of an operating system, both during an initial setup and during ongoing operation of the data center 10A. In some aspects, a fabric management server 140 can discover network devices (e.g., switches, routers, servers etc.) and determine appropriate software images to be provisioned on the network devices based on the hardware configurations and roles assigned to the network devices. A practical application of the techniques described in further detail below is that software for the network devices in a data center 10A can be provisioned with minimal manual configuration required on the part of an administrator. The reduction of manual configuration effort is an advantage that some examples can provide over previous provisioning methodology and may avoid errors and increase network scalability.

In accordance with techniques of this disclosure, an automated process may be used to select software images for devices of data center 10A and upgrade the devices with the software images during provisioning or update operations. More specifically, techniques of this disclosure include processes for upgrading a device to a specific operating system (OS) version based on the capability of the device. Different software images may support a different set of functionalities (e.g., EVPN, sampled flow (sFlow), etc.). Also, different hardware platforms and even same hardware platform, based on the chassis configuration, may support a different set of functionalities. In a large data center, there could be many such devices with same/different hardware platform configurations.

As described herein, software images can be automatically mapped to a matrix representing the hardware platform and the features supported by the software image. When a new device for data center 10A is onboarded (e.g., added to the system), its hardware details such as the hardware platform and the chassis configuration can be probed. Based on this information, a hardware profile can be assigned to the device. The hardware profile can include data that indicates the capabilities and feature set for the device. By correlating the device capability and feature set based on the hardware profile with the hardware platform and feature matrix for the device images, the specific software image to be installed for a given OS version can be identified and used for provisioning the device. A similar process may be applied for upgrading devices. Multiple devices in data center 10A may be upgraded to the specific OS version by selecting images using techniques described in this disclosure.

In some aspects, the fabric management server 140 may discover network devices and obtain hardware configuration information 146 from the network devices. The hardware configuration information 146 may be maintained in a configuration database 142. The hardware configuration information can include hardware manufacturer information (e.g., product make and model, version identifiers, serial numbers etc.), network interface information (e.g., make, model, network type, supported protocols, communication speed etc.), available storage, processor types and other information regarding the hardware on a network device such as a switch, router, or server. The hardware configuration information 146 may be organized according to the data models described below with respect to FIGS. 3A-3E.

UI device 129 can be used (e.g., by an administrator 24) to assign roles 144 to the switches, routers, and servers in a data center 10A. The assigned roles 144 may be maintained in configuration database 142. For example, a user interface available in UI device 129 can provide identifiers for the network devices and hardware discovered in data center 10A. Further, the user interface can provide labels for roles that may be applied to the discovered network devices.

Configuration database 142 may further maintain software images 150 for the network devices in data center 10A. The software images 150 may be configured to execute on a particular type of processor or processors that may be found in the network devices. Further, the software images 150 may be configured with device drivers and other support software for devices that may be part of the hardware configuration of the network devices. Moreover, the software images 150 may be configured to support differing protocols from one another. For example, one software image may be configured to support MPLS on a particular hardware configuration, while a different software image may be configured to support EVPN on the same hardware configuration. Similarly, the software images 150 may be configured to support the same functionality on different hardware configurations. For example, one software image may be configured to support virtual routers on a server from one manufacturer, while another software image may be configured to support virtual routers on a server from a different manufacturer.

Configuration database 142 may maintain software image configuration information 148 for the software images 150. The software image configuration information 148 may include the type of hardware supported by software image, functionality provided by the software image (e.g., protocols, applications, device drivers, etc.), version information and other aspects associated with a particular software image. The software image configuration information 148 for a particular software image may be obtained by examining tags, labels, symbols etc. found in the software image or in executables contained in the software image.

The roles 144 assigned to network devices, the hardware configurations 146 for the network devices, and the software image configuration information 148 for the software images 150 may be used as further described below to automatically select software images for provisioning to the various network devices in a data center 10.

In the example illustrated in FIG. 1, configuration database 142 maintains roles 144, hardware configuration 146, software image configurations 148, and software images 150. In other examples, some or all of the roles 144, hardware configuration 146, software image configurations 148, and software images 150 may be maintained in separate databases.

Figure 2:
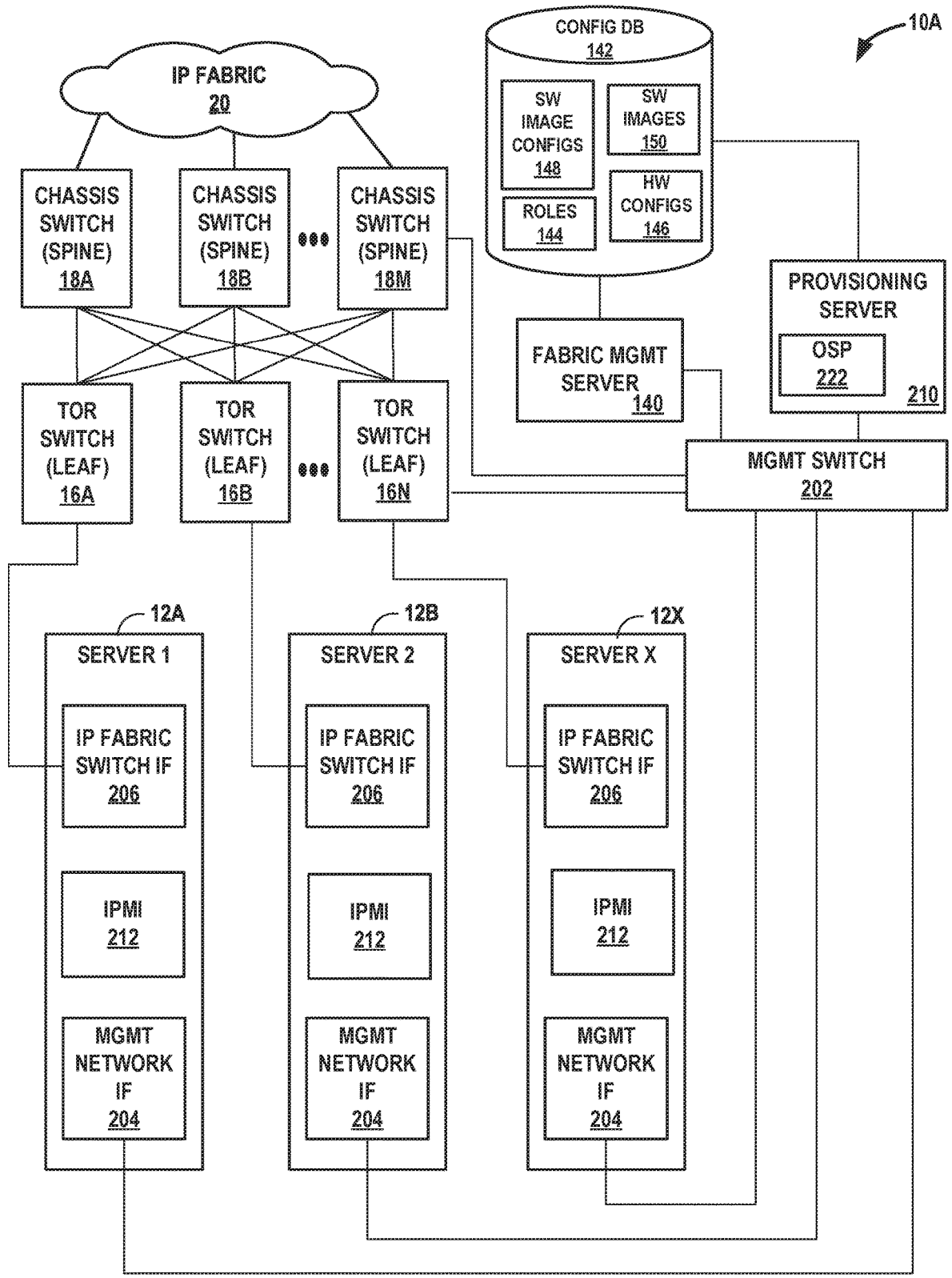
FIG. 2 is a block diagram illustrating an example implementation of a data center in the example computer network system of FIG. 1 in further detail.

FIG. 2 is a block diagram illustrating an example implementation of a data center in the example computer network system of FIG. 1 in further detail. In the example of FIG. 2, data center 10A includes a fabric management server 140 and a provisioning server 210 communicably coupled to a management switch 202. Servers 12, chassis switches 18 and TOR switches 16 are also communicably coupled to the management switch 202. The management switch and the server connections and switch connections to the management switch form an out-of-band management network.

Each of the servers 12 can include a management network interface 204, an IP fabric switch interface 206, and an Intelligent Platform Management Interface (IPMI) 212. Management network interface 204 provides a hardware and/or software interface that provides for communicating data between a server 12A-12X to the management switch 202. IP fabric switch interface 206 provides a hardware and/or software interface that provides for communicating data between a server 12A-12X to a TOR switch 16A-16N.

IPMI 212 provides an interface to a computing system (e.g., any of servers 12) that can be used to monitor and manage the operation of the computing system that is independent of the computing system's host processor(s) and operating system. For example, IPMI 212 can enable a system administrator to manage a computing system that is powered off, has not been completely configured or lacks the ability to function or communicate as intended.

Fabric management server 140 may control the execution of various discovery and configuration related workflows. As noted above, data collected, produced, and used by the fabric management server 140 may be maintained in configuration database 142.

Provisioning server 210 can access software images 150 such as system images, application images, containers, installation packages etc. in configuration database 142 that may be provided to network devices such as servers 12, TOR switches 16 and chassis switches 18. In some aspects, provisioning server 210 can select a software image to be provisioned on a network device by matching attributes in the hardware configuration 146 for a network device with attributes of a software image configuration 148 for a software image. The provisioning server 210 can select a software image from software images 150 that has attributes indicating the software contained in the software image can execute successfully on a network device based on the hardware configuration for the network device. Further, a software image may be selected from software images 1500 based on a role 144 or roles assigned to a network device in addition to, or instead of selecting the software image based on the hardware configuration information 146.

In some aspects, the provisioning server 210 can provide software images to the network devices via the management switch 202. For example, provisioning server 210 may access software images including an operating system and/or applications that can be downloaded to server 12A in response to discovering server (e.g., during a discovery process or workflow) and determining hardware configuration information for server 12A. In the example illustrated in FIG. 2, an Open Stack Platform (OSP) 222 has been installed on provisioning server 210 and can be used to provision network devices.

FIGS. 3A-3E are block diagrams illustrating example network configuration data models in accordance with techniques described herein. The example network configuration data models can be used to specify data structures for data stored in a data store such as configuration database 142. The example network configuration data models presented in FIGS. 3A-3E can correspond with hardware configuration data 146 that is added as a result of the discovery of network devices by fabric management server 140 and the roles 144 assigned to the network devices.

Figure 3A:
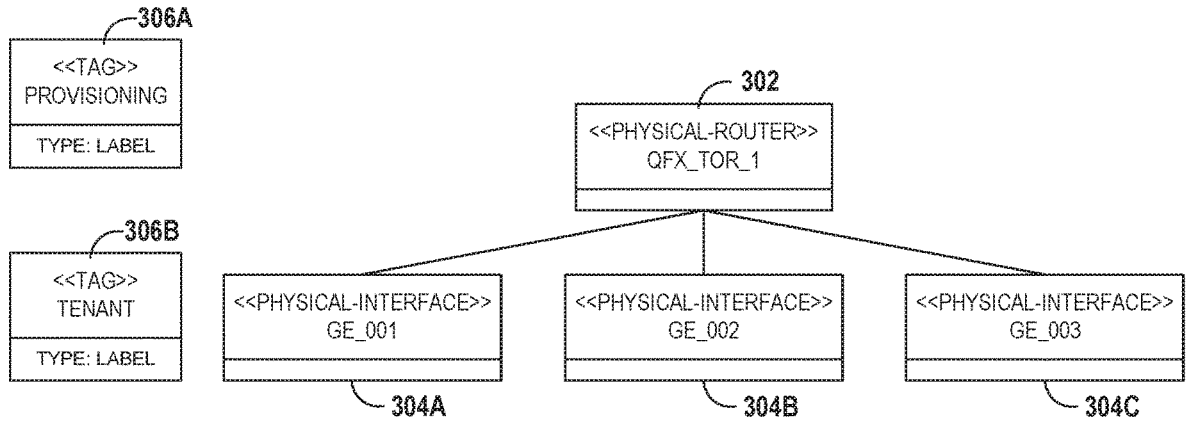
FIGS. 3A-3E are block diagrams illustrating network configuration data in accordance with techniques described herein.

FIG. 3A is a block diagram illustrating example network configuration data structures that can be added as a result of the execution of IP fabric discovery workflows by fabric management server 140. Tags 306A and 306B can include data that describes a type of network. In the example illustrated in FIG. 3A, tags are used to describe a "Provisioning" network type and a "Tenant" network type. Other types or labels for networks are possible. After the IP fabric discovery workflows have been executed, configuration data regarding switches is learned by the fabric management server 140. In the example illustrated in FIG. 3A, a physical router data structure 302 created as part of the discover process includes data regarding a particular switch identified as "QFX_TOR_1." For example, QFX_TOR_1 may be an identifying label assigned to TOR switch 12A (FIG. 2). In addition, in the example illustrated in FIG. 3A, fabric management server 140 has discovered three ports on the switch QFX_TOR_1 and in response creates physical interface data structures 304A, 304B and 304C to represent the physical ports GE_001, GE_002 and GE_003 on switch QFX_TOR_1. Data structures for logical interfaces (not shown) that may be associated with the physical interface data structures may also be created by the fabric management server 140.

Figure 3B:
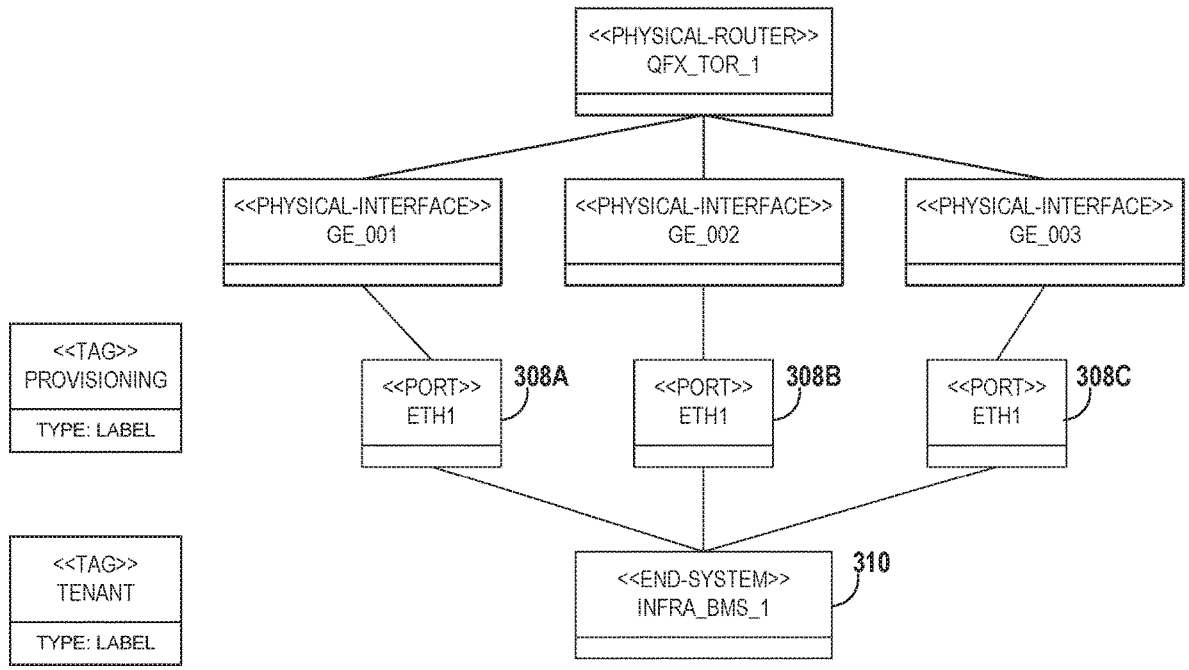

FIG. 3B is a block diagram illustrating example network configuration data structures that can be added as a result of the execution of server discovery workflows by fabric management server 140. The example data structures of FIG. 3B will be described with reference to a single discovered server (e.g., server 12A). Similar data structures could be added for other servers 12. In the example illustrated in FIG. 3B, fabric management server 140 has discovered server 12A and created end-system data structure 310 to describe the server 12A. In this example, server 12A has been given the identifier of "INFRA_BMS_1." The fabric management server 140 has discovered that server 12A has three ports, and in response, can create three port data structures 308A, 308B and 308C to hold data describing the ports. In addition, fabric management server 140 has discovered that three ports are physically linked to three corresponding switch ports and creates references from each of the port data structures 308A-308C describing the three server 12A ports to the corresponding physical interface data structures 304A-304C describing the switch physical interfaces.

Figure 3C:
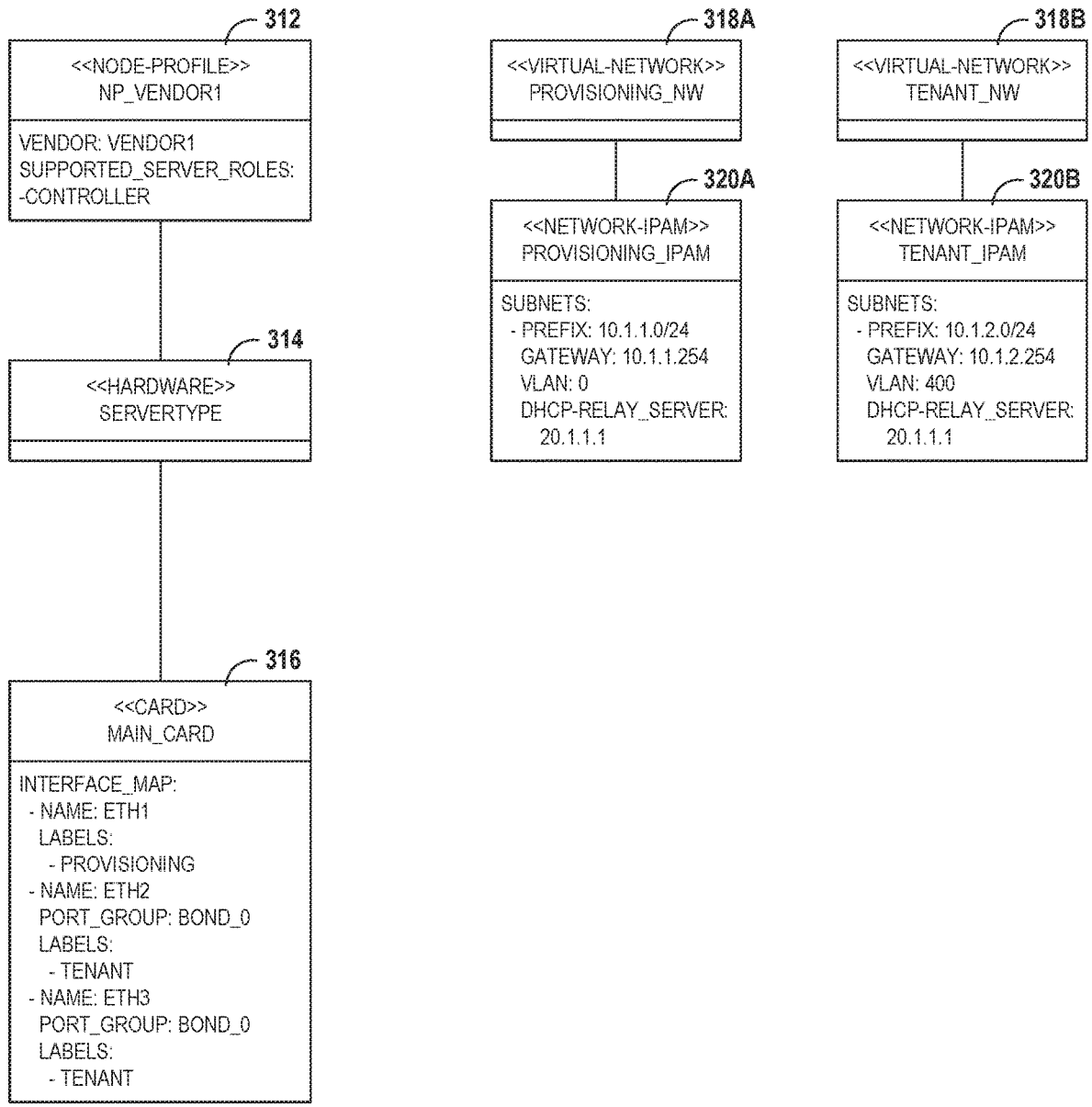
Figure 3D:
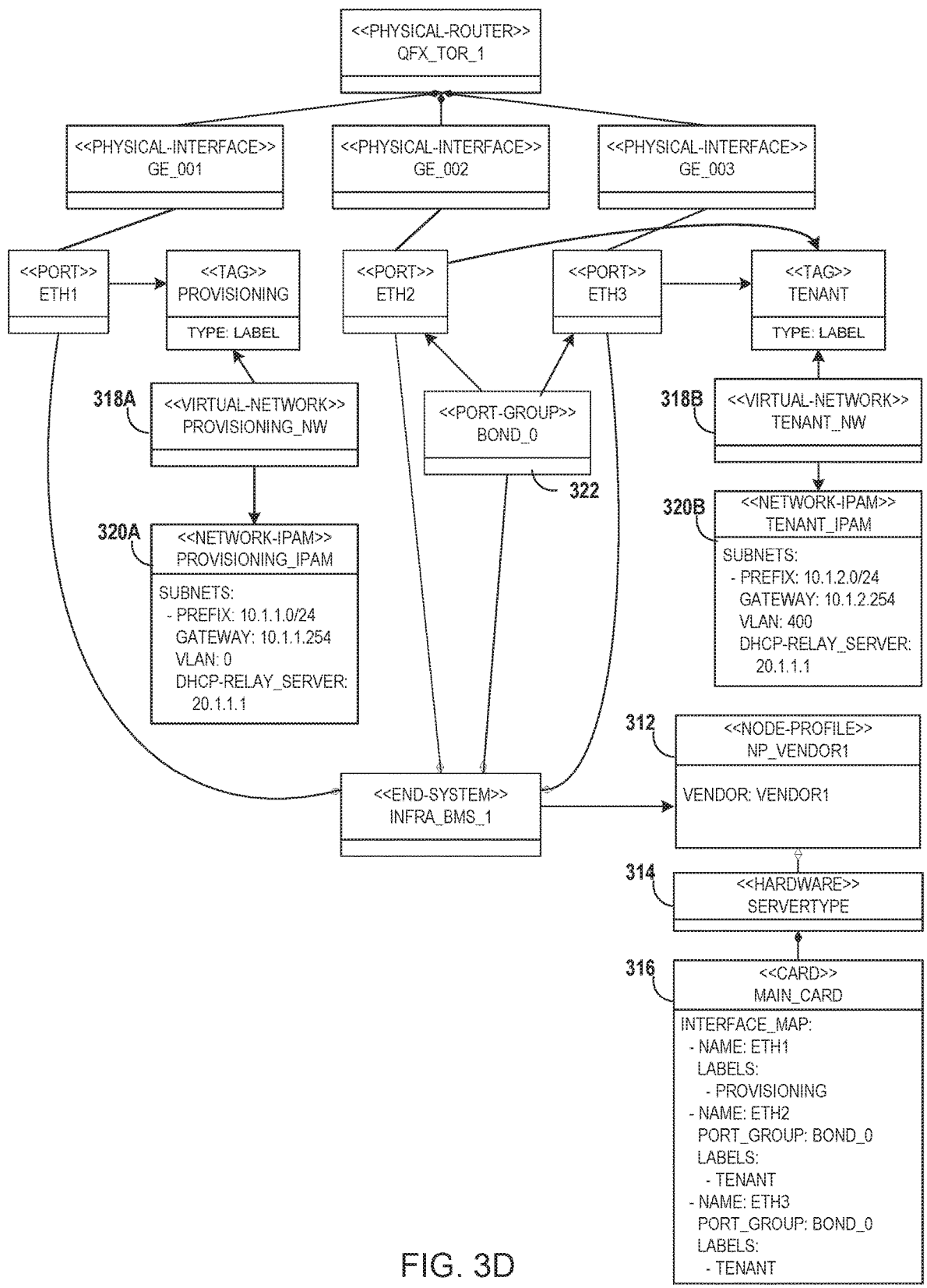

FIGS. 3C and 3D are block diagrams illustrating example network configuration data structures that may be created by server discovery workflows executed by fabric management server 140. FIG. 3C illustrates example node profile data structures 312-316 and example infrastructure network data structures 318-320. The node profile data structures can describe the particular hardware associated with a server. In the example illustrated in FIG. 3C, a node-profile data structure 312 includes data identifying the manufacturer of the server (e.g., "vendor1") and the roles that can be supported by the server. A hardware data structure 314 can describe the particular type of server (e.g., "servertype"). For example, the type of server may identify a brand name or other label that identifies the type of server. A card data structure 316 can include data describing the network interface(s) available on the identified server. For example, a card data structure can include a name for the card, names for the interfaces on the card, labels for the interfaces on the card, port groups to which an interface belongs (if any), and other data that may be useful in describing an interface card.

Virtual_network data structures 318A and 318B can include data describing virtual networks that are configured for the data center 10A. In the example illustrated in FIGS. 3C and 3D, the virtual_network data structure 318A identifies a virtual network labeled "PROVISIONING_NW" and virtual_network data structure 318B identifies a virtual network labeled "TENANT_NW." In addition, IP Address Management (IPAM) data can be stored for the virtual networks. In the example illustrated in FIGS. 3C and 3D, a network_IPAM data structure 320A stores IPAM data associated with the provisioning virtual network and network_IPAM data structure 320B stores IPAM data associated with the tenant virtual network. The IPAM data can include IP addresses for gateways and Dynamic Host Configuration Protocol (DHCP) relays for the network, and can include VLAN configuration data.

FIG. 3D illustrates the above-described configuration data structures after the fabric management server 140 has linked the data structures to reflect the physical and virtual network configuration of the devices in network data center 10A. In addition to linking the data structures, the fabric management server 140 can identify port groups from data stored in the data structures. In the example illustrated in FIG. 3D, the fabric management server 140 has discovered via the node profile data that ports ETH2 and ETH3 are part of a port group labeled "BOND_0", and in response, has created a port_group data structure 322 to indicate the port grouping.

Figure 3E:
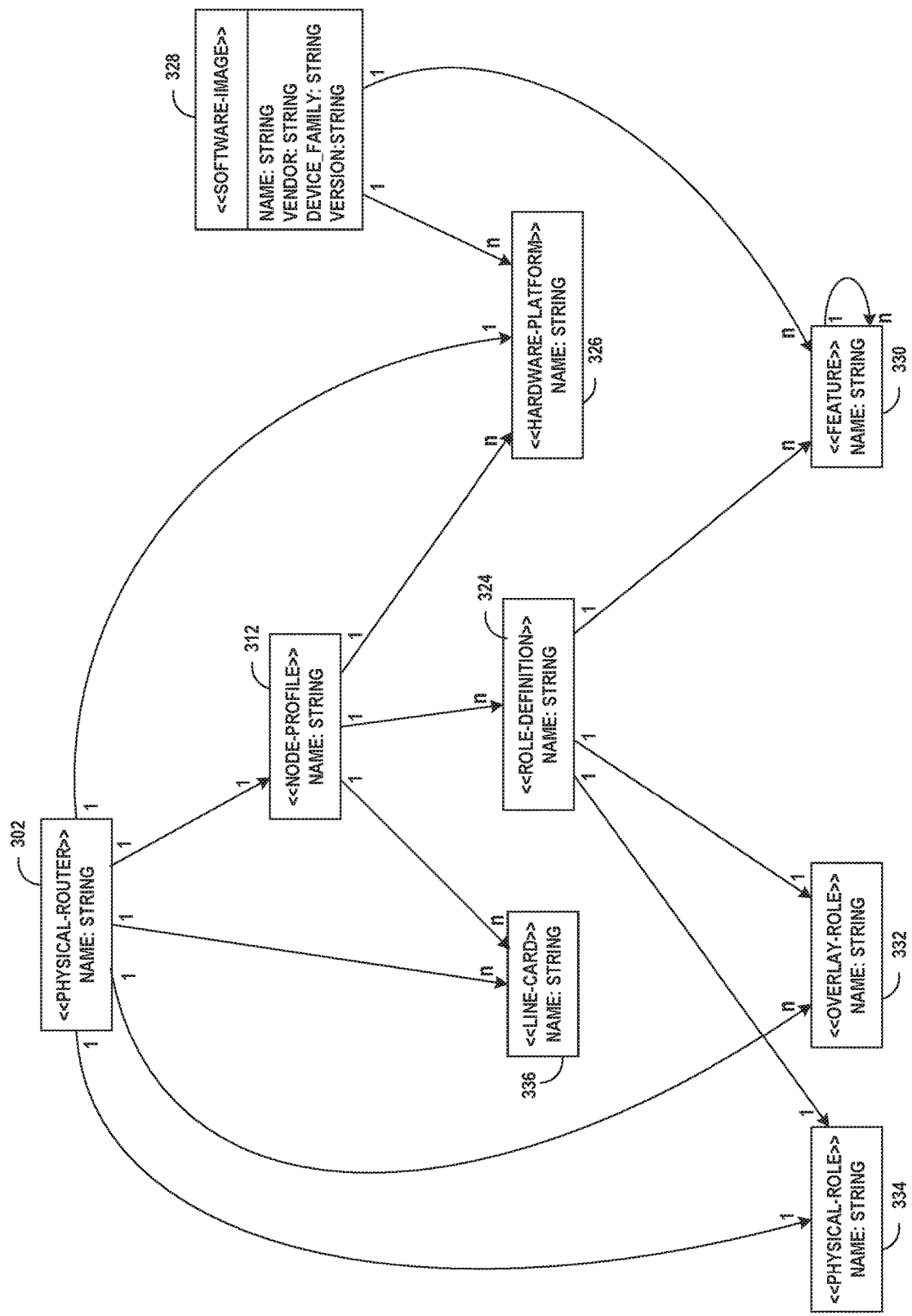

FIG. 3E is a block diagram illustrating an example data model including data structures that associate roles and features of a software image with roles and features of a hardware configuration. In the example illustrated in FIG. 3E, the data model includes a physical router data structure 302 that identifies a particular switch in the data center 10A (via the "name" field). The physical router data structure 302 may have an association with a node profile data structure 312 that identifies a profile associated with the physical router. The node profile may be labeled with the name uniquely identifying the node profile. The node profile may be linked with a hardware platform data structure 326. The hardware platform data structure 326 may include fields that identify a supported platform for the node profile. For example, the platform data structure 326 may include fields that identify the make/model of the physical router, the processor type of the physical router etc. The node profile 312 may be linked with a line card data structure 336. The line card data structure 336 may include a field identifying a line card used by the physical router. There may be a line card data structure 336 for each line card configured with the physical router represented by physical router data structure 302. The node profile data structure 312 may be linked with a role definition data structure 324.

The role definition data structure 324 may identify a particular role assigned to the node profile. There may be one role definition data structure 324 for each role assigned to a node profile. In some aspects, the following node profile roles may be specified:
Juniper-qfx5k
Juniper-qfx5k-lean
Juniper-qfx10k
Juniper-mx
Juniper-srx The above profiles specify different manufacturer hardware models that can perform or support a similar set of functionalities.

In some aspects, a role may be further associated with an overlay role. The overlay role may be defined in an overlay role data structure 332 that may be linked with a role definition data structure 324. In some aspects, the following overlay roles may be specified:
  CRB-Access—indicates that the physical router is connected to a bare metal server. This role configures the interfaces and bridge domains/VLANs.
  CRB-Gateway—indicates that the physical router is a gateway device to provide L3 connectivity/functionality within and across virtual networks.
  ERB-UCAST-Gateway—indicates that the physical router is a L3 gateway for unicast traffic across virtual networks. Typically, this role may be assigned to leaf physical routers
  CRB-MCAST-Gateway—indicates that the physical router is an L3 gateway for multicast traffic across virtual networks.
  DC-Gateway—indicates that the physical router provides connectivity to the internet
  DCI-Gateway—indicates that the physical router provides connectivity with another fabric.
  Route-Reflector—indicates that the physical router is a route reflector in the IP Clos iBGP session.
  Assisted-Replicator-Client—indicates that the physical router is an Assisted Replicator Leaf
  Assisted-Replicator—indicates that the physical router is an Assisted Replicator.
  PNF-ServiceChain—indicates that the physical router is a Physical Network Function (PNF) router and provides Service Chaining capability.

In some aspects, a physical router and/or a role may be further associated with a physical role. The physical role may be defined in a physical role data structure 334 that can be linked with a physical router data structure 302 and/or a role definition data structure 324.
  leaf—identifies the physical router as a leaf switch in a Clos network topology.
  spine—identifies the physical router as a spine switch in a Clos network topology.
  pnf—identifies the physical router as capable of being configured with firewall rules or other rules for managing the flow of network traffic.

In some aspects, a role can be associated with one or more features. Each feature may be described in a feature data structure 330 that may be linked to a role definition data structure 324. In some aspects, the following features may be specified:
  underlay_ip_clos—configures the underlay IP Clos network and sets up the underlay BGP session.
  underlay_infra_bms_access—onboards a bare metal server (BMS) connected to the physical router on the underlay IP Clos network.
  overlay_bgp—configures an overlay BGP session.
  overlay_evpn—configures basic overlay EVPN VXLAN configuration.
  overlay_evpn_access—configures overlay ports for L2 connectivity.
  overlay_evpn_erb_access—configures overlay ports for L2 connectivity using trunk port configuration.
  overlay_evpn_gateway—configures overlay L3 gateway to handle unicast and multicast traffic.
  overlay_evpn_ucast_gateway—configures overlay L3 gateway to handle unicast traffic.
  overlay_evpn_mcast_gateway—configures overlay L3 gateway to handle multicast traffic.
  overlay_evpn_type5—configures overlay type 5 VPN to connect virtual networks.
  overlay_security_group—configures firewalls and filters.
  overlay_lag—configures link aggregation (LAG) ports.
  overlay_multi_homing—configures Link Aggregation Control Protocol (LACP) multi homed ports.
  overlay_fip_snat—configures floating IP and Source Network Address Translation (SNAT).
  overlay_pim—configures Protocol independent Multicast (PIM).
  overlay_service_chain—configures routing instances for service chaining.
  overlay_assisted_replicator—configures assisted replicator.
  overlay_assisted_replicator_client—configures assisted replicator client/leaf.

The example data model illustrated in FIG. 3E may also include a software image data structure 328 that describes aspects of a software image. The software image data structure 328 may include fields that specify a name uniquely identifying the software image, the vendor providing the software image, a device family that can execute the software in the software image, and a version identifier for the software image. In addition, the software image may be configured to support one or more features. Each of the features supported by the software image represented by the software image data structure 328 may be described in feature data structure 330 (described above) that may be linked to the software image data structure 328.

Figure 4:
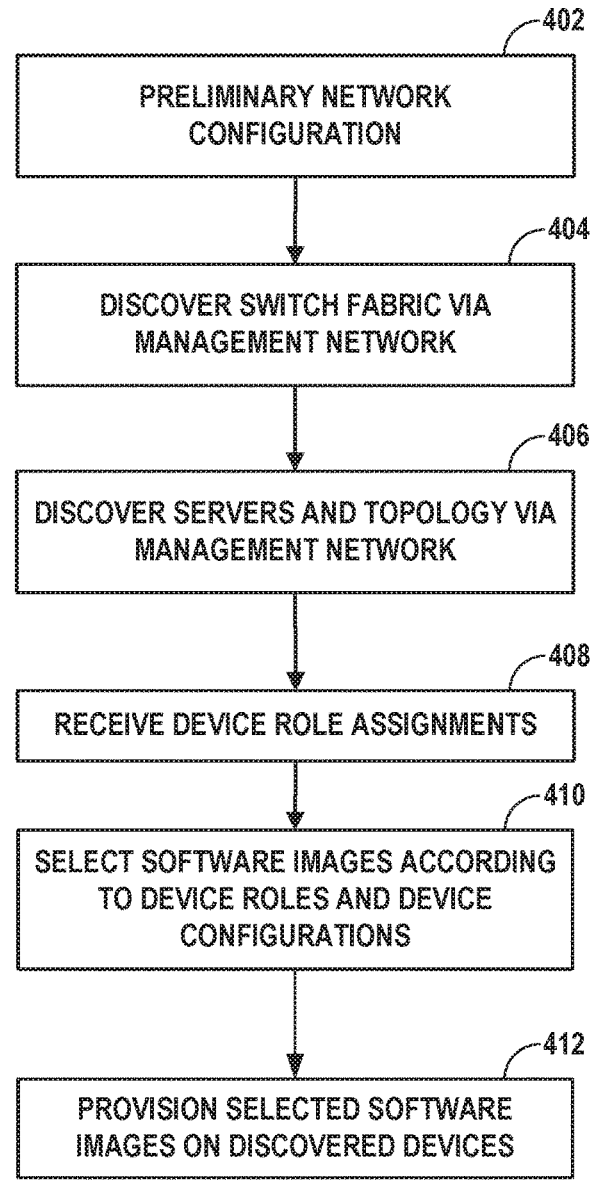
FIG. 4 is a flowchart illustrating a method for selecting software images for provisioning on network devices in accordance with techniques described herein.

FIG. 4 is a flowchart 400 illustrating operations of a method for configuring network devices in a data center in accordance with techniques described herein. In some aspects, the operations can be performed to provision software for network devices in a new data center, to provision software for network devices for a reconfigured data center, or to provision new network devices added to an existing data center. Preliminary network configuration operations can be performed to establish an initial state of the network configuration (402). In some aspects, a configuration wizard can present an interface to receive network configuration parameters from a user. The network configuration parameters may be parameters that cannot be otherwise obtained through the discovery process. For example, the user may provide information about VLANs, subnets, loopbacks, Autonomous System Numbers (ASNs) etc. that are to be configured in the data center network. The configuration wizard can store this information as part of the configuration data base 142 for the network The configuration wizard 220 can initiate one or more workflows on fabric management server 140 that can cause the fabric management server 140 to discover switch devices (i.e., data center switches) on an IP fabric (404). In some aspects, the discovery workflows utilize a management network that links the data center switches (e.g., chassis switches 16 and TOR switches 18) to a management switch. In some aspects, the fabric management server 140 can discover data center switches by listening for DHCP requests that are issued by the data center switches. For example, a switch may issue a DHCP request when the switch is powered on. Upon receipt of the DHCP request from a data center switch, the fabric management server 140 can utilize information in the request and information in a DHCP database to add switch configuration information about the discovered switch to the configuration database 142. For example, the fabric management server 140 can add data structures such as the example data structures illustrated in FIG. 3A to the configuration database 142.

The configuration wizard 220 can initiate one or more server discovery workflows to cause the fabric management server 140 to discover servers and other network topology information (406). In some aspects, the discovery process uses a management switch to send and/or receive discovery messages. The server discovery workflows can cause the fabric management server 140 to receive configuration information from servers that are connected to the out-of-band management network. The fabric management server 140 can add the server configuration information to the configuration database 142.

Figure 5:
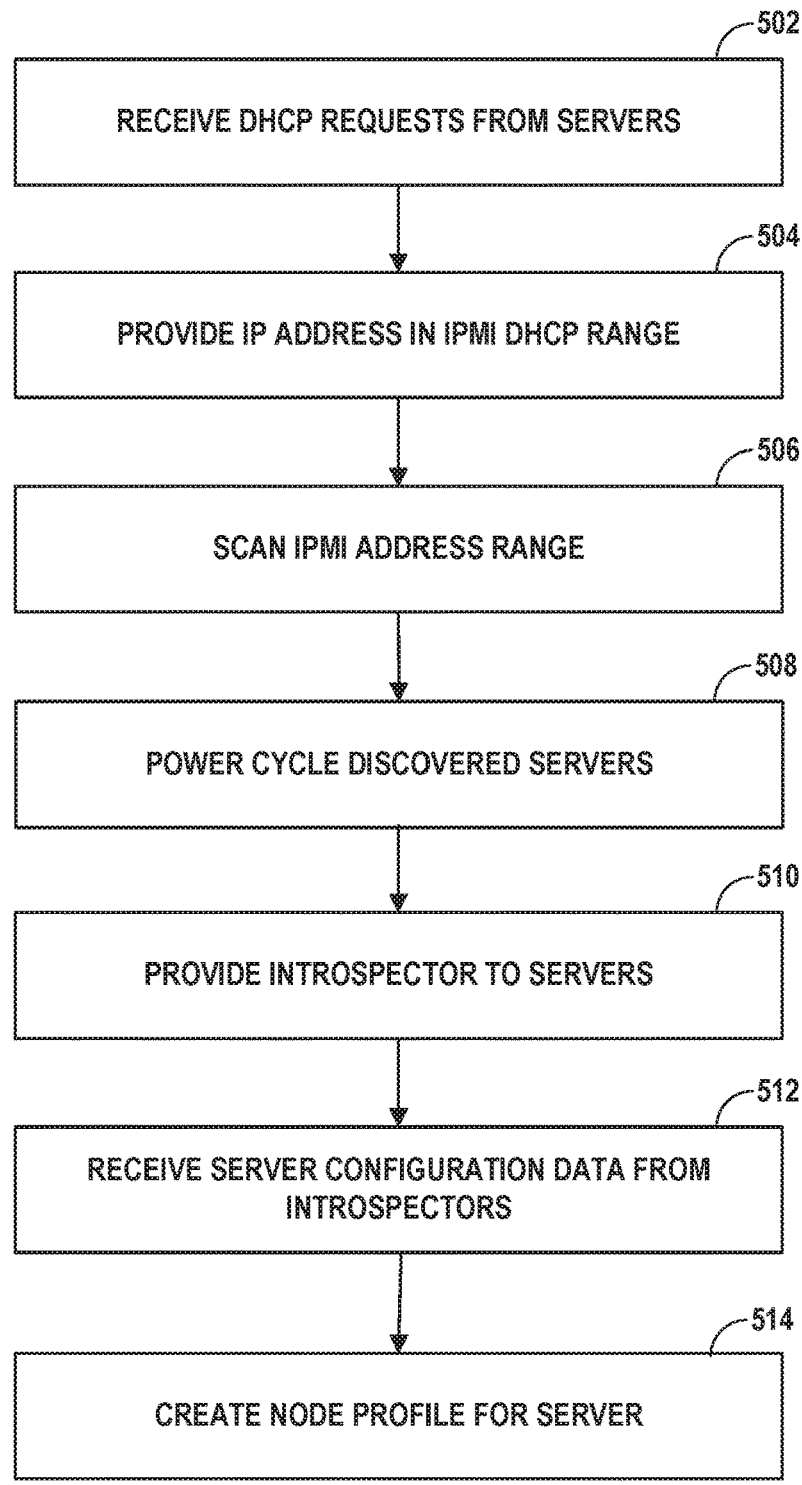
FIG. 5 is a flowchart illustrating example operations of a method for discovering servers in accordance with techniques described herein.

FIG. 5 is a flowchart 500 illustrating example operations of a method for discovering and configuring servers in accordance with techniques described herein. In some aspects, the operations can be performed by a fabric management server 140 (FIGS. 1 and 2) executing a server discovery workflow. In some aspects, discovering a server can start by the fabric management server 140 receiving a DHCP request from a server (502). For example, an IPMI 212 (FIG. 2) on a server (e.g., server 12A, FIG. 2) can issue a DHCP request when the IPMI 212 or server incorporating the IPMI 212 is powered on. In response to the DHCP request, the fabric management server 140 can provide an available IP address assignment from within an IPMI DHCP address range (504).

The fabric management server 140 can scan the IPMI address range (506). For example, the fabric management server 140 can issue a ping message to an IP address in the IPMI address range. If the fabric management server 14) receives a response to the ping message, the fabric management server 140 can determine if the responding device is a server that has not already been discovered (i.e., an "undiscovered" server). The fabric management server 140 can cause each undiscovered server to be rebooted or power cycled (508). For example, the fabric management server 140 can send a message to an IPMI 212 on an undiscovered server to cause the server to be power cycled.

After being power cycled (or rebooted), the server may boot from a Pre-Boot eXecution Environment (PXE) interface. In some aspects, the PXE interface is communicably coupled to the management network via management switch 202. The PXE interface can obtain an introspector from provisioning server 210 that performs an introspection of the server (510). The introspection can include obtaining a list of network interfaces on the server, and a mapping of the server network interfaces to switch ports based on Link Layer Discover Protocol (LLDP) data produced as a result of the introspection. After the introspector performs the introspection, the introspector can send the resultant server configuration data to the fabric management server 140 (512). As an example, in conjunction with the server discovery process discussed above, the fabric management server 140 can add data structures such as the example data structures 308 and 310, illustrated in FIG. 3B to the configuration database 142.

The fabric management server 140 can use the configuration data to create a node profile for the server (514). The node profile can include information such as the vendor name or manufacturer name that manufactures the server, a model name or other identifier for the type of the server, etc. In some aspects, fabric management server 140 can import node profiles based on information discovered about the server and add the appropriate node profile to the configuration database 142. For example, the fabric management server 140 can create data structures 312, 314 and 316 (FIGS. 3C and 3D).

Returning to FIG. 4, the fabric management server 140 can receive role assignments for network devices in the data center 10A (408). As discussed above, a user interface on a UI device 129 may be used to add roles to the configuration database 142. One or more roles can be assigned to the discovered servers and switches that can describe the functionality provided by the servers and switches. A server or switch may have more than one role at any given time.

For each discovered network device (e.g., switch, router, server etc.), the fabric management server 140 can select a software image to be loaded onto the device based on the role of the device, the hardware configuration of the device, and the hardware and features supported by the software image. For example, in some aspects, the fabric management server 140 can create a hardware capability matrix from the network device's discovered hardware configuration and assigned role and can create a software capability matrix from the software image configuration for each software image in a configuration database 142. The fabric management server 140 can compare the hardware capability matrix for a device to each of the software capability matrices to determine a software image that is appropriate to for the discovered network device. In some aspects, the software image may be selected according to a best fit algorithm that compares the hardware capability matrix to each of the software capability matrices. Thus, the fabric management server 140 can determine the software image whose configuration best matches the hardware configuration and role of the network device.

In alternative aspects, a hardware capability graph may be created based on the network device's hardware configuration, and a software capability graph may be created from each of the software image configurations. The fabric management server 140 can then perform graph searching to determine the software image whose configuration best matches the hardware configuration and role of the network device.

The fabric management server 140 can then cause the selected software image to be provisioned on the discovered network device (412). For example, the fabric management serve may send a message to the provisioning server 210 to cause the provisioning server 210 to load the selected software image onto the network device. In some aspects, the fabric management server 140 can cause an Ansible script to be executed that causes the OSP 222 (FIG. 2) to provision the selected software image on the network device.

As will be appreciated from the above, the fabric management server 140 can perform various workflows to automatically discover network devices in a data center such as switches and servers in a data center network and can utilize the discovered information from the various workflows to automatically configure and provision the discovered network devices. The automated configuration and provisioning techniques described herein are a practical application that can provide advantages of conventional systems such as providing a more scalable data center configuration process and can reduce errors in the data center configuration process.

The hardware, software, and firmware for the above-described aspects may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

The invention claimed is:

1. A method comprising:
  obtaining, by a fabric management server, hardware capability information for a network device communicatively coupled to an IP fabric;
  obtaining, by the fabric management server, software capability information for each software image of a plurality of software images, the software capability information specifying a plurality of functional features provided by the software image;
  identifying, based on the hardware capability information for the network device and the software capability information, the software image of the plurality of software images to be installed on the network device; and
  causing a server storing the identified software image to install the identified software image on the network device.

2. The method of claim 1,
  wherein the identifying comprises determining the software image that supports all of the network device hardware capabilities for the network device.

3. The method of claim 1,
  wherein the plurality of software images are for a single operating system version.

4. The method of claim 1, wherein the network device comprises a physical server, and wherein obtaining, by the fabric management server, hardware capability information for the physical server comprises:
  discovering the physical server; and
  receiving, by the fabric management server from the physical server, at least a portion of the hardware capability information.

5. The method of claim 1,
  wherein the hardware capability information comprises a hardware capability matrix and the software configuration information comprises a software capability matrix; and
  wherein identifying the software image comprises:
    comparing the hardware capability matrix with each respective software capability matrix of the plurality of software images, and
    selecting the identified software image based on the comparison.

6. The method of claim 5, wherein selecting the identified software image based on the comparison comprises selecting the identified software image based on a best-fit comparison.

7. The method of claim 1,
  wherein the hardware capability information comprises a hardware capability graph and the software configuration information comprises a software capability graph; and
  wherein identifying the software image comprises:
    performing graph searching on the software capability graph with respect to features in the hardware capability graph, and
    selecting the identified software image based on an output of the graph searching.

8. The method of claim 1, further comprising:
  receiving one or more role assignments for the network device;
  wherein identifying the software image comprises identifying the software image based, at least in part, on the one or more role assignments associated with the network device.

9. A system comprising:
  a network device communicatively coupled to an IP fabric; and
  one or more first processors and a first memory configured to implement a fabric management server configured to:
    obtain hardware capability information for the network device,
    obtain software capability information for each software image of a plurality of software images, the software capability information specifying a plurality of functional features provided by the software image,
    identify, based on the hardware capability information for the network device and the software capability information, the software image of the plurality of software images to be installed on the network device; and
  one or more second processors and a second memory configured to implement a provisioning server storing the identified software image, wherein the fabric management server is further configured to cause the provisioning server to install the identified software image on the network device.

10. The system of claim 9,
wherein the fabric management server is configured to identify the software image that supports all of the network device hardware capabilities for the network device.

11. The system of claim 9,
wherein the plurality of software images are for a single operating system version.

12. The system of claim 9,
wherein the one or more first processors are the same processors as the one or more second processors.

13. The system of claim 9, wherein the network device comprises a physical server, and wherein the fabric management server is configured to:
discover the physical server; and
receive, from the physical server, at least a portion of the hardware capability information.

14. The system of claim 9,
wherein the hardware capability information comprises a hardware capability matrix and the software configuration information comprises a software capability matrix; and
wherein the fabric management server is configured to:
compare the hardware capability matrix with each respective software capability matrix of the plurality of software images, and
select the identified software image based on the comparison.

15. The system of claim 9, wherein the fabric management server is further configured to:
receive one or more role assignments for the network device; and
identify the software image based, at least in part, on the one or more role assignments associated with the network device.

16. The system of claim 9, wherein the network device comprises an IP fabric switch.

17. A non-transitory computer-readable medium comprising instructions for causing one or more programmable processors to:
obtain hardware capability information for the network device;
obtain software capability information for each software image of a plurality of software images, the software capability information specifying a plurality of functional features provided by the software image;
identify, based on the hardware capability information for the network device and the software capability information, the software image of the plurality of software images to be installed on the network device; and
cause a server storing the identified software image to install the identified software image on the network device.

18. The non-transitory computer-readable medium of claim 17, wherein the instructions further comprise instructions to cause the one or more programmable processors to:
receive one or more role assignments for the network device; and
identify the software image based, at least in part, on the one or more role assignments associated with the network device.

19. The non-transitory computer-readable medium of claim 17, wherein the hardware capability information comprises a hardware capability matrix and the software configuration information comprises a software capability matrix, and wherein the instructions further comprise instructions to cause the one or more programmable processors to:
compare the hardware capability matrix with each respective software capability matrix of the plurality of software images, and
select the identified software image based on the comparison.

* * * * *